United States Patent [19]

Baumeister

[11] Patent Number: 4,684,995
[45] Date of Patent: Aug. 4, 1987

[54] SIMULTANEOUS EXPOSURE/FOCUS CONTROL IN A VIDEO CAMERA USING A SOLID STATE IMAGE SENSOR

[75] Inventor: Hans P. Baumeister, Churchville, N.Y.

[73] Assignee: Eastman Kodak Company, Rochester, N.Y.

[21] Appl. No.: 876,630

[22] Filed: Jun. 20, 1986

[51] Int. Cl.[4] .......................... H04N 5/16; G03B 3/00
[52] U.S. Cl. .................................... 358/227; 358/228; 354/402; 354/429
[58] Field of Search ................ 358/227, 228; 354/402, 354/429, 410

[56] References Cited

U.S. PATENT DOCUMENTS

| | | | |
|---|---|---|---|
| 4,047,187 | 9/1977 | Mashimo et al. | 354/23 D |
| 4,327,378 | 4/1982 | Tanaka et al. | 358/228 |
| 4,329,577 | 5/1982 | Asano et al. | 250/201 |
| 4,584,610 | 4/1986 | Mizokami | 358/228 |
| 4,609,944 | 9/1986 | Nakada | 358/228 |
| 4,623,237 | 11/1986 | Kaneda | 358/227 |

Primary Examiner—Gene Z. Rubinson
Assistant Examiner—L. C. Schroeder
Attorney, Agent, or Firm—Robert M. Wallace

[57] ABSTRACT

An apparatus is disclosed for providing automatic exposure/focus control in a solid state video camera by converting the image information from a solid state image sensor to a digital representation and using the least significant bits of the digital representation for focus detection and the most significant bits for exposure measurement.

5 Claims, 1 Drawing Figure

SIMULTANEOUS EXPOSURE/FOCUS CONTROL IN A VIDEO CAMERA USING A SOLID STATE IMAGE SENSOR

FIELD OF THE INVENTION

The present invention relates to automatic exposure and focus control in a solid state video camera. In particular, the invention relates to video cameras that commonly use a solid state image sensor for exposure measurement and/or focus detection.

DESCRIPTION RELATIVE TO THE PRIOR ART

It is known in the art to employ a solid state image sensor of a video camera as a light detecting device for the exposure control system of the camera. The common use of the image sensor for exposure control eliminates the need for a separate light sensing device. Similarly, the image sensor may be commonly used as a focus detection device as shown in U.S. Pat. No. 4,047,187. Focus detection is accomplished by determining the maximum absolute value of the difference in the output signals of two adjacent sensor elements of the image sensor.

Typically, when the image sensor is commonly employed for exposure measurement and focus detection the image sensor must be cycled twice to provide image information for both operations, i.e. the exposure and focus detection operations are performed sequentially on different frames of image information. The efficiency of the exposure measurement and focus detection operations would be improved if the two operations were performed simultaneously on the same frame of image information provided by the image sensor.

SUMMARY OF THE INVENTION

The present invention recognizes that the digitized output of the image sensor can be used to provide simultaneous exposure and focus control in a video camera, by utilizing only the least significant bits of the digitized pixel information for focus detection and the most significant bits of the digitized pixel information for exposure measurement.

Such a "split bits" technique takes recognition of the fact that focus detection is primarily concerned with high-frequency detail information, as may be discerned from the least significant bits of digitized pixel information. Exposure measurement, however, is centered on the overall image intensity (as represented by the most significant bits) and not necessarily with high frequency detail image information. The "split bits" technique incorporated by the present invention permits simultaneous exposure measurement and focus control on the same frame of image information provided by the image sensor in real time.

The invention will now be described with reference to the FIGURE, which is a schematic block diagram of an apparatus according to the invention.

DESCRIPTION OF THE PREFERRED EMBODIMENTS

Figure 1:
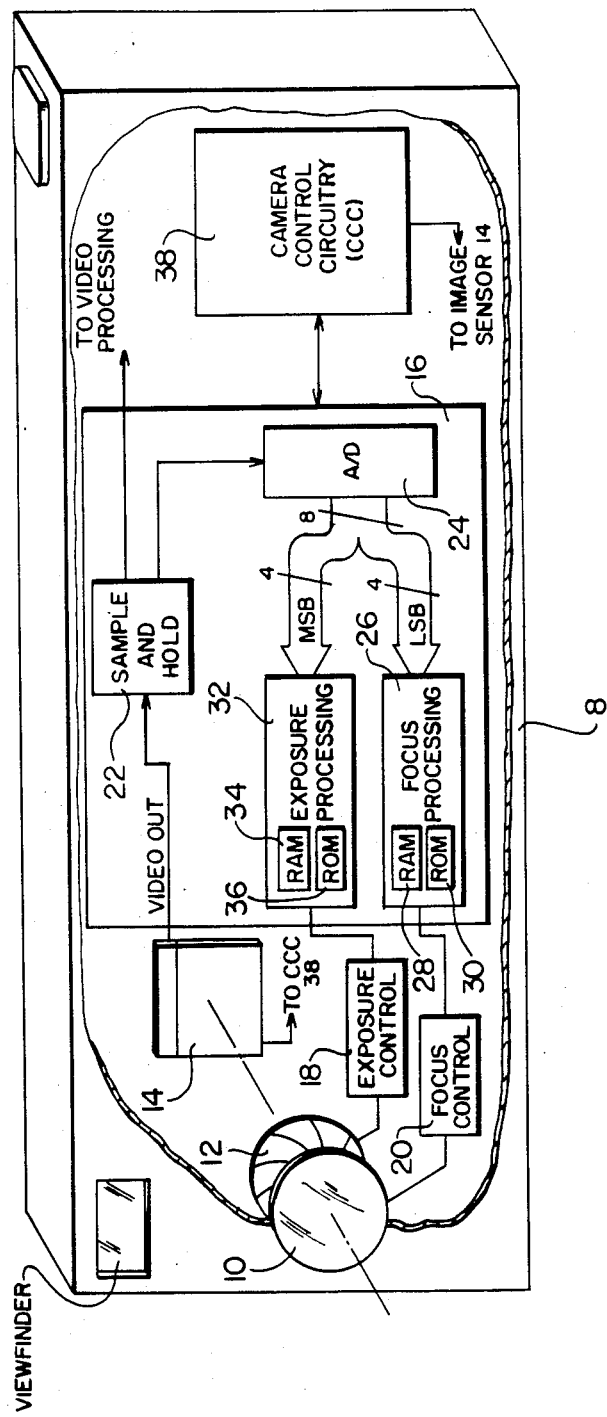

A solid state video camera 8 is shown having a lens 10, diaphragm 12, image sensor 14 and exposure/focus control circuitry 16. Exposure control actuator 18 controls the diameter of the diaphragm 12 aperture and focus control actuator 20 moves the lens 10 to change the focal length of the video camera 8.

The video signal generated by the image sensor 14, which consists of a number of image pixels, is provided to a sample and hold circuit 22 of the exposure/focus control circuitry 16. The output signal from the sample and hold circuit 22 is then provided to an analog to digital (A/D) converter 24 that converts the analog signal to a digital word, each word representing one image pixel. For purposes of illustrating the invention, the A/D converter 24 will be described as having a word length of eight bits, although it will be readily apparent to one skilled in the art that A/D converters having a different word length may be utilized. The eight bit word is divided into two segments. One segment contains the least significant bits (LSB) and the other segment contains the most significant bits (MSB) of the digital word. It will be understood that the segments are so chosen that the LSB contain sufficient detail information for focus detection and the MSB contain sufficient information for exposure measurement.

The word segments containing the LSB are provided to the focus detection processing module 26 of exposure control circuitry 16. The focus detection processing module 26 has its own random access storage (RAM) 28 and read only memory (ROM) 30. The ROM 30 is used to store a desired focus detection algorithm and the RAM 28 is used to store the LSB pixel information received by the focus detection processing module 26 from the A/D converter 24. Similarly, the word segments containing the MSB are provided to the exposure processing module 32 (which also has its own RAM 34 and ROM 36) from the A/D converter 24.

Camera control circuitry 38 generates the timing and control signals for the exposure/focus control circuitry 16 and image sensor 14. Only a fraction of the image area of the sensor 14 is necessary for focus detection and exposure measurement, for example, a "window" of 64 pixels by 64 lines in the center of the image area. The camera control circuitry 38, therefore, selectively activates the sample and hold circuit 22 to sample only the desired pixels.

The focus control processing module 26 applies the appropriate focus control algorithm to the LSB pixel data received from the A/D converter 24 to determine if the video camera 8 is properly focused. As stated previously, focus detection is based on high frequency (detail) information found in the least significant bits of the digitized pixel information. The exposure control actuator 18 is controlled by the focus control processing module 26 and in turn corrects the focal length of the video camera 8 to properly focus the image being scanned by the image sensor 14. The exposure control processing module 32 works in a similar fashion to the focus control module. The processor 28 receives the MSB from the A/D converter 24. The MSB of the pixel information provide sufficient image information to determine proper exposure. The processing module 32 applies the appropriate exposure control algorithm to the pixel data and controls the exposure control actuator 18 which in turn changes the aperture of the diaphragm 12. Real time exposure measurement and focus control is thereby accomplished simultaneously utilizing the same set of digitized pixel information.

The invention has been described in detail with particular reference to preferred embodiments thereof, but it will be understood that variations and modifications can be effected within the spirit and scope of the invention. For example, exposure control actuator 18 could be replaced with a shutter time control system if shutter priority exposure control is preferred over aperture priority.

What is claimed is:

1. An exposure measurement and focus detection apparatus for a video imaging system comprising:
   a. image sensing means having a plurality of pixel elements that generate electrical signals proportional to the light incident on said pixel elements,
   b. digital conversion means for converting the electrical signals generated from said pixel elements to a digital word having n bits, said digital word having at least two segments,
   c. focus processing means, coupled to said digital conversion means, for receiving a first segment of said digital word and determining if said video imaging system is focused, and
   d. exposure processing means, coupled to said digital conversion means, for receiving a second segment of said digital word and determining the exposure of said video imaging system.

2. The apparatus as claimed in claim 1 further comprising:
   a. focus control means responsive to said focus processing means for correcting the focus of said image processing system, and
   b. exposure control means responsive to said exposure processing means for correcting the exposure of said video imaging system.

3. A video camera comprising:
   a. image sensing means having a plurality of pixel elements which together generate an electrical signal proportional to light incident upon said image sensing means,
   b. digital conversion means for converting the electrical signal generated to a digital signal,
   c. focus processing means, coupled to said digital conversion means, for receiving the least significant bits of said digital signal and determining if said video camera is focused,
   d. exposure processing means, coupled to said digital conversion means, for receiving the most significant bits of said digital signal and determining the exposure of said video camera,
   e. focus control means responsive to said focus processing means for correcting the focus of said video camera, and
   f. exposure control means responsive to said exposure processing means for correcting the exposure of said video camera.

4. An exposure measurement and focus detection apparatus for a video imaging system comprising:
   a. image sensing means having a plurality of pixel elements that generate electrical signals proportional to the light incident on said pixel elements,
   b. digital conversion means for converting the electrical signals generated from a group of said pixel elements into a digital signal,
   c. focus processing means, coupled to said digital conversion means, for receiving the least significant bits of said digital signal and determining if said video imaging system is properly focused, and
   d. exposure processing means, coupled to said digital conversion means, for receiving the most significant bits of said digital signal for determining the proper exposure of said video imaging system.

5. The apparatus as claimed in claim 1 further comprising:
   a. focus control means responsive to said focus processing means for correcting the focal length of said image processing system, and
   b. exposure control means responsive to said exposure processing means for correcting the exposure of said video imaging system.

* * * * *